UNITED STATES PATENT OFFICE.

JOHN H. McWHIRTER, GEORGE W. LANGLEY, AND JULIUS B. UPTON, OF MOODY, MISSOURI.

PROCESS OF TANNING.

SPECIFICATION forming part of Letters Patent No. 451,385, dated April 28, 1891.

Application filed September 29, 1890. Serial No. 366,584. (No specimens.)

*To all whom it may concern:*

Be it known that we, JOHN H. McWHIRTER, GEORGE W. LANGLEY, and JULIUS B. UPTON, citizens of the United States, residing at Moody, in the county of Howell and State of Missouri, have invented certain new and useful Improvements in Composition for Tanning Hides, of which the following is a specification.

Our invention relates to an improved composition for tanning hides, skins, &c.; and the invention consists of a composition of matter for tanning the hides, composed of the following ingredients combined in about the proportions stated, viz: To fifteen gallons of water add one pound fluid extract of Jamestown weed, one pound of hemlock, five gallons oak ooze, eight pounds gambier, two pounds alum, and one-half gallon of strong hickory or pecan bark ooze. These ingredients are to be mixed thoroughly, and after the hides or skins are limed, unhaired, and fleshed, soak until the lime is all out, put them in the ooze, there to remain twelve hours, then expose them to the air ten or fifteen minutes, and continue dipping in the ooze, each time for twelve hours, and each time on taking out expose to the air ten or fifteen minutes until tanned, the process requiring for heavy upper harness-leather from thirty-six to seventy-two hours, for sole-leather from seventy-two to one hundred and forty-four hours, light hides from six to twelve hours.

The strength and manner of preparing some of the ingredients above named are as follows: We take sixteen pounds of the leaves and stalk of Jamestown weed (or six pounds of the seed thereof) and boil about one hour and a half in eleven gallons of water. The result will be the equivalent of two pounds of fluid extract of Jamestown weed.

The hemlock may be applied either in its natural state or its soluble ingredients only used.

To secure the oak-bark ooze, take from fifteen to twenty pounds of oak-bark in eleven gallons of water and boil to reduce to five gallons.

The hickory or pecan bark ooze is obtained by boiling three pounds of bark in one and a half gallons of water until reduced to one-half gallon.

Having thus described our invention, what we claim as new, and desire to secure by Letters Patent, is—

The herein-described composition for tanning leather, consisting of fifteen gallons of water, one pound fluid extract of Jamestown weed, one pound hemlock, five gallons oak ooze, eight pounds gambier, two pounds alum, and one-half gallon of hickory or pecan bark ooze, in the proportions above named.

J. H. McWHIRTER.
G. W. LANGLEY.
J. B. UPTON.

Witnesses:
NEWTON F. McCALLON,
RICHARD N. WRIGHT.